United States Patent [19]

Ekhoff

[11] Patent Number: 4,755,981
[45] Date of Patent: Jul. 5, 1988

[54] SPINDLE CLAMP FOR REMOVABLE DISKS

[76] Inventor: Donald L. Ekhoff, 14137 Hidden Spring La., Morgan Hill, Calif. 95037

[21] Appl. No.: 7,129

[22] Filed: Jan. 27, 1987

[51] Int. Cl.⁴ .................. G11B 17/28; G11B 25/04
[52] U.S. Cl. ................................ 369/270; 360/97; 279/2 A
[58] Field of Search ............ 369/270, 280, 281, 282, 369/289, 290; 360/97, 98; 279/2 R, 2 A

[56] References Cited

U.S. PATENT DOCUMENTS

| 3,968,972 | 7/1976 | Morgan | 279/2 R |
| 4,125,883 | 11/1978 | Rolph | 360/99 |
| 4,171,531 | 10/1979 | Grapes et al. | 360/99 |
| 4,232,870 | 11/1980 | Iemenschot | 274/39 |
| 4,499,514 | 2/1985 | Yamamiya et al. | 360/97 |
| 4,587,647 | 5/1986 | Mak et al. | 369/270 |

FOREIGN PATENT DOCUMENTS

| 194181 | 11/1983 | Japan | 369/270 |
| 239961 | 11/1985 | Japan | 369/270 |
| 240472 | 10/1986 | Japan | 369/270 |

Primary Examiner—Steven L. Stephan
Attorney, Agent, or Firm—Thomas Schneck

[57] ABSTRACT

A spindle clamp for supporting a disk for rotation about an axis, the disk having a central aperture, in which fluid pressure actuates release of the disk and split jaws clamp the disk in the absence of fluid pressure. The clamp includes a hub which is rotatable about a central axis, an annular jaw split into a plurality of jaw pieces and disposed in a trough defined in the hub. A cap is spring biased downward against the jaw pieces. A central cone located radially inward from the trough defines a wedge surface. O-ring springs bias the jaw pieces inward into engagement with the wedge surface. Fluid pressure applied through passageways in the hub against a diaphragm causes the diaphragm to bulge upward against the jaw pieces, releasing the disk.

10 Claims, 3 Drawing Sheets

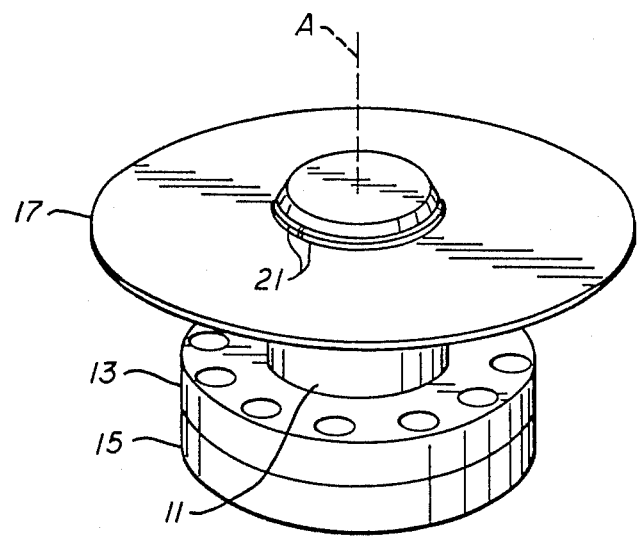
FIG._1.
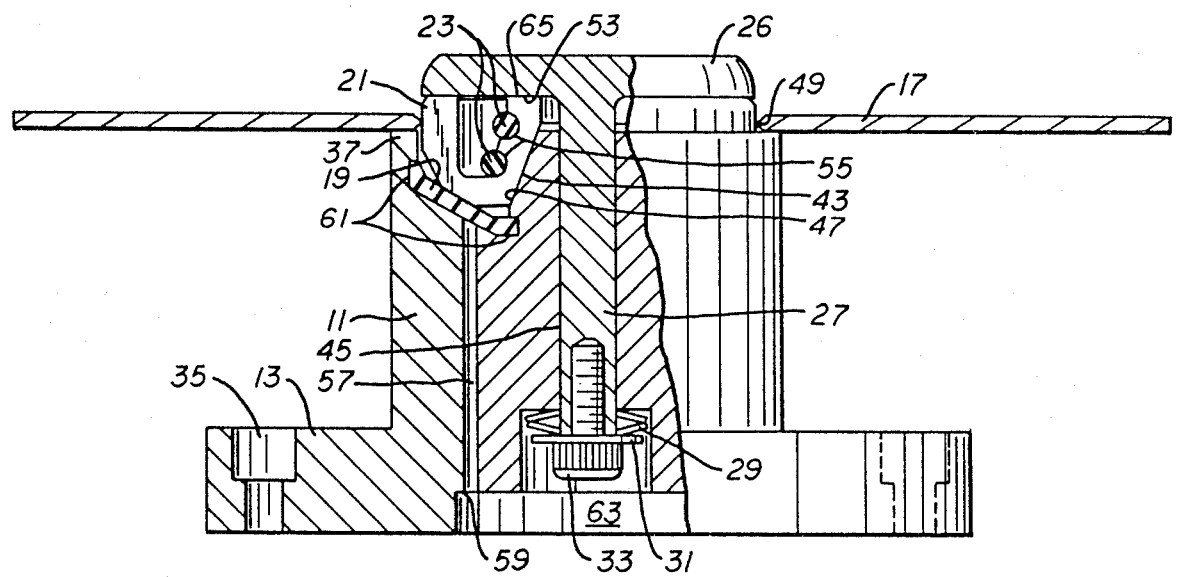
FIG._3.

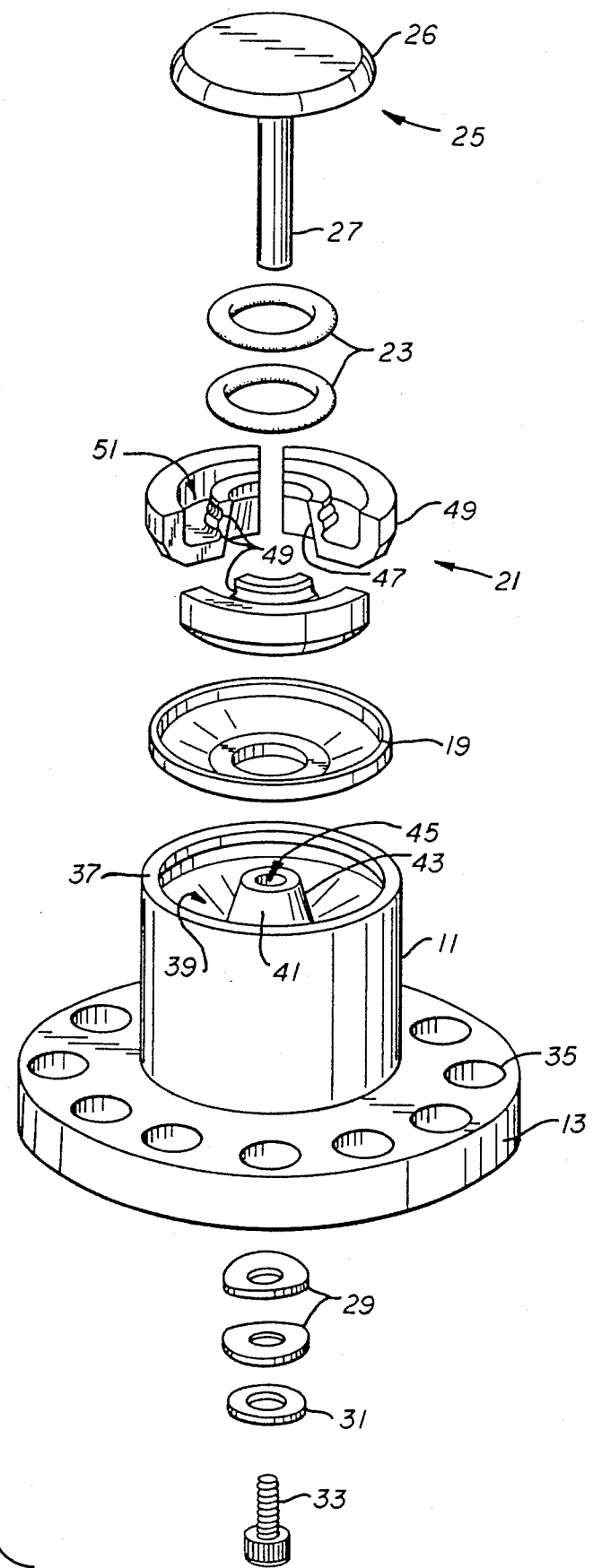
FIG._2.

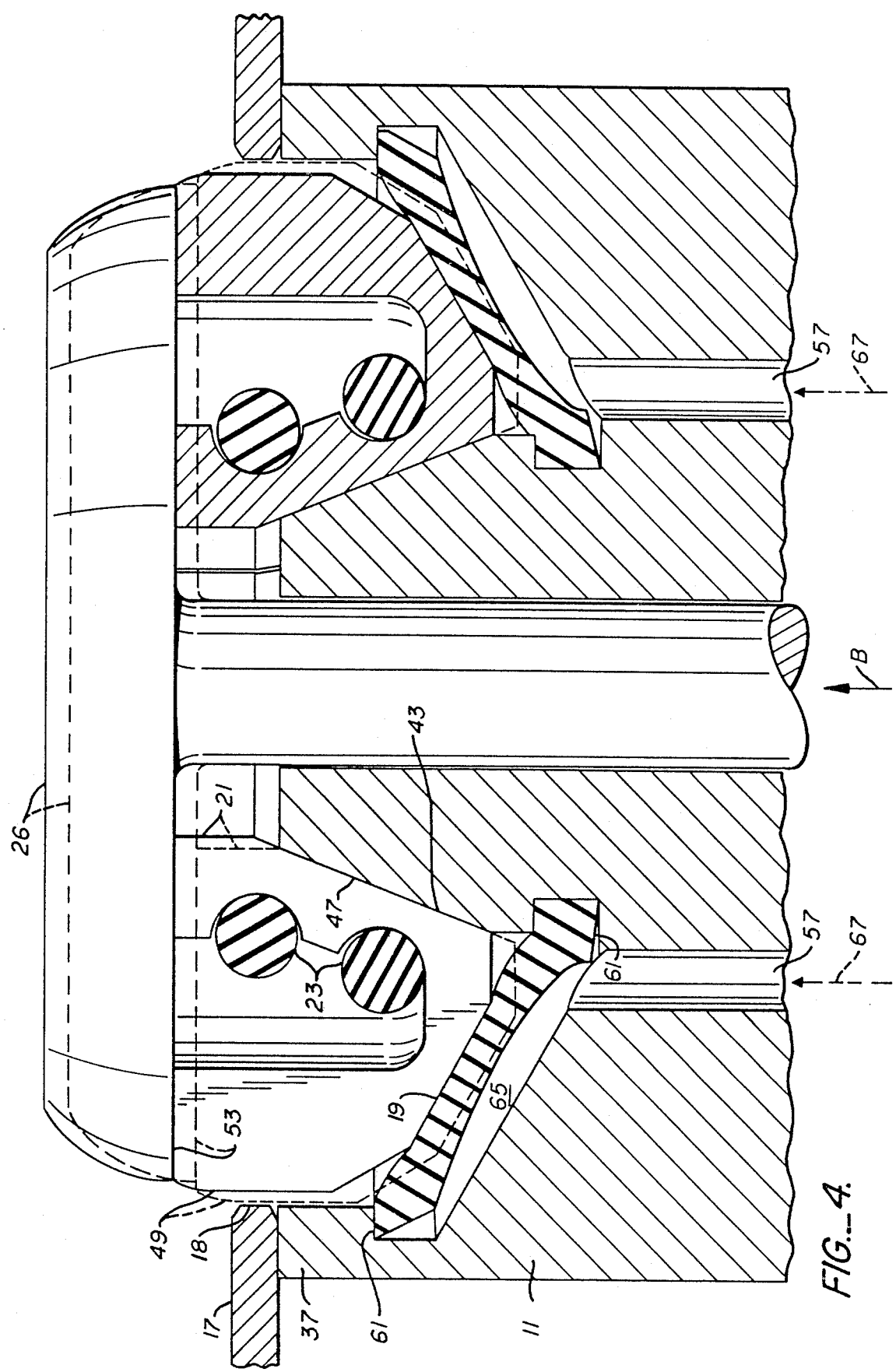
FIG._4.

SPINDLE CLAMP FOR REMOVABLE DISKS

DESCRIPTION

TECHNICAL FIELD

The present invention relates to clamping devices adapted for supporting and releasing a disk and in particular to spindle clamps for removably supporting a disk for rotation about an axis, where the disk has a central aperture.

BACKGROUND ART

In U.S. Pat. No. 4,587,647, Mak et al. disclose a media spindle clamp for disk drives comprising a disk-like hub for centering a removable disk-like recording media and a magnet chuck for clamping the media on the hub. The hub has a central conical post which extends axially beyond the plane of a radially displaced annular rim. An annular magnet, preferably permanent, is disposed between the post and the rim and a strike ring is engaged with or embedded in an inner circumferential portion of the disk. The recording media seats on the post and makes contact therewith before reaching the plane of the rim. The magnet deflects the recording media into contact with the rim.

An object of the invention is to produce a spindle clamp which securely supports a disk without flexing and which may be actuated to freely release the disk when desired.

Another object of the invention is to produce a spindle clamp which does not use a magnet so as to be capable of supporting magnetic as well as optical data disks.

DISCLOSURE OF THE INVENTION

The above objects have been met with a spindle clamp in which fluid pressure actuates release of a disk and split jaws engage the aperture edge of the disk to clamp the disk in the absence of fluid pressure. The spindle clamp comprises a hub which is rotatable about a central axis, an annular jaw split into a plurality of jaw pieces and disposed in a trough defined in the top end surface of the hub, a cap in contact with the jaw pieces with means for biasing the cap downward against the jaw pieces and means for applying fluid pressure to force the jaw pieces upward. A portion of the hub forms a central cone radially inward from the trough, the surface of the cone defining a wedge surface. O-ring springs are provided for biasing the jaw pieces inward into engagement with the wedge surface.

In the absence of fluid pressure, such as from a pressurized air source, the cap forces the jaw pieces downward and the wedge surface forces the jaw pieces outward into engagement with a disk. Fluid pressure is applied through passageways in the hub to a diaphragm in the bottom of the trough. The diaphragm bulges upward forcing the jaw pieces on top of the diaphragm upward. The O-ring springs maintain the jaw pieces in engagement with the wedge surface, thereby forcing the jaw pieces inward, releasing the disk.

BRIEF DESCRIPTION OF THE DRAWINGS

FIG. 1 is a perspective view of a spindle clamp of the present invention supporting a disk.

FIG. 2 is an exploded view of the spindle clamp of FIG. 1.

FIG. 3 is a partially cutaway side view of the spindle clamp and disk of FIG. 1.

FIG. 4 is a side sectional view of the spindle clamp which is actuated to release a disk.

BEST MODE FOR CARRYING OUT THE INVENTION

With reference to FIG. 1, a spindle clamp comprising a cylindrical hub 11 with a base 13 and split jaws 21 is mounted for rotation to a turntable 15. Hub 11 seats a disk 17 and holds it securely by means of split jaws 21 in an upper end of hub 11. Disk 17 is typically a record medium, such as a magnetic or optical data disk. Disks of this type are well known and usually have a central aperture of a predetermined inside diameter. A standard inside diameter for data disks is 40.0 mm. Disk 17 fits over the top of the spindle clamp, being held by split jaws 21 engaging against the inner aperture edge of disk 17. Turntable 15 causes hub 11 and turns disk 17 to rotate about a central axis of rotation, indicated by dashed line A.

In FIG. 2, the spindle clamp may be seen to include cylindrical hub 11 with base 13, an annular flexible diaphragm 19, split jaws 21 with O-ring springs 23, a cap 25 comprising a head 26 and a post 27, and a bellville spring 29 together with a washer 31 and a screw 33. Hub 11 and base 13 typically form a unitary body. Base 13 may be secured to a turntable by bolts inserted through holes 35 around base 13. For standard 40 mm aperture disks, the height of the combined hub and base is typically about 1.86 inches (47.3 mm), the diameter of base 13 is typically about 3.45 inches (87.6 mm), and the diameter of hub 11 is typically about 1.80 inches (45.7 mm). Other dimensions may be used for this and other size disks, but in all cases the diameter of hub 11 should exceed the diameter of the disk aperture. Thus, the top end surface of cylindrical hub 11 forms a disk mounting surface 37 for seating a data disk.

Hub 11 has an annular trough 39 defined in the top end surface thereof. The portion of the top end surface radially outward from trough 39 forms a substantially flat rim 37 which is the disk mounting surface. Rim 37 is preferably at least 5 mm wide. A portion of hub 11 which is radially inward from trough 39 forms a central cone 41. Cone 41 has a base diameter which is typically about 0.75 inches (19.0 mm) and a top diameter of about 0.50 inches (12.7 mm) level with the top end surface of hub 11. Thus, central cone 41 has an angled surface 43 for wedge engagement with split jaws 21. Hub 11 also includes an axial bore 45 through cone 41 to the bottom end surface of hub 11.

Annular flexible diaphragm 19 is made of silicone rubber molded to a size and shape capable of forming a fluid tight fit at the bottom of trough 39. Diaphragm 19 has an inner circular edge which is 0.10 inch (2.5 mm) thick and 0.65 inch (16.5 mm) in diameter. Diaphragm 19 also has an outer circular edge which is 0.10 inch (2.5 mm) thick and 1.68 inches (42.7 mm) in diameter. Other size diaphragms may be used depending on the dimensions of trough 39. Likewise, other flexible materials may be used in place of silicone rubber.

Split jaws 21 are formed from an annular jaw piece. The radially inner surface 47 of the jaw piece is angled at about 20 degrees from the central axis of the jaw piece so as to match the angled wedge surface 43 of trough 39 in hub 11. Thus, surface 47 substantially conforms to the surface 43 central cone 41. The radially outer surface 49 of the jaw piece is parallel to the jaw's central axis at a distance of about 0.79 inches (20.0 mm) therefrom and forms the clamping face for securing a disk. An annular channel 51 is formed in a top surface 53 of the jaw piece. A plurality of grooves 55 are defined in a radially inner surface of channel 51 for holding O-ring springs 23 therein. The annular jaw piece thus formed is split, for example by radial sawing, into a plurality of pieces. In FIG. 2, a 3-piece split jaw 21 is shown, but the number of pieces may vary from two to about eight depending on the size of the spindle clamp.

O-ring springs 23 are typically a pair of silicone rubber bands with a circular diameter of about 0.80 inch (20.0 mm) and a material thickness of about 0.14 inch (0.4 mm) when unstretched. Other elastic materials may be used in place of silicone rubber. Larger spindle clamps may require a greater number, as well as larger, O-ring springs.

Cap 25 includes a post 27 which is connected to the underside of a head 26 and extends from the center of the cap perpendicular thereto. Head 26 is a substantially circular disk about 0.20 inch (5.1 mm) thick with a diameter, about 1.50 inches (38.1 mm), sufficiently large to contact top surface 53 of split jaws 21 and thereby hold split jaws 21 in trough 39. Post 27 has a diameter which is slightly less than the diameter of bore 45 in hub 11, typically about 0.25 inch (6.3 mm), for fitting into bore 45.

With reference to FIG. 3, a plurality of passageways 57 through hub 11 communicate with diaphragm 19 disposed at the bottom of trough 39. The opposite end of each passageway 57 from diaphragm 19 is an input end 59 for introducing a fluid, such as air or water, under pressure. Passageways 57 are typically two in number on opposite sides of hub 11. Alternatively, the number and positions of passageways 57 may correspond to the number and positions of the plurality of jaw pieces of split jaws 21. In FIG. 3, passageways 57 open at input ends 59 into a common cavity 63 in the base of hub 11. Cavity 63 communicates with a source of pressurized fluid. Alternatively, each passageway 57 may communicate separately with one or more sources of pressurized fluid. Trough 39 has annular recessed regions 61 located in inner and outer side surfaces thereof. Inner and outer edges of diaphragm 19 engage recessed regions 61 in a fluid tight fit.

Split jaws 21 are disposed in trough 39 over diaphragm 19. Radially inner surface 47 of the jaw pieces engage wedge surface 43. O-ring springs 23 are disposed in grooves 55 and bias the jaw pieces of split jaws 21 against wedge surface 43. A portion of the radially outer surface 49 of the jaw pieces extends above the top surface of hub 11 to form a clamping face securely engaging disk 17 at its central aperture.

Post 27 fits into axial bore 45 of hub 11. A bottom surface 65 of disk-shaped head 26 of cap 25 is in contact with the top surface 53 of split jaws 21. Post 27 emerging from bore 45 is biased by bellville springs 29. Springs 29 fit around post 27 between the bottom end of hub 11 and a washer 31 on the end of post 27. A screw 33 fits into post 27 to hold washer 31 and springs 29 in place. Thus, springs 29 together with washer 31 and screw 33 form means for biasing cap 25 downward against split jaws 21.

With reference to FIG. 4, in operation the spindle clamp is capable of being moved into a disk clamping position, shown in phantom, and a disk release position, shown in solid. In the disk clamping position, post 27 is biased downward by bellville springs or the like. Post 27 which extends from disk-shaped head 26, thereby causes head 26 to push down against top surface 53 of split jaws 21. Radially inner surface 47 of split jaws 21 engages angled wedge surface 43, so that as split jaws 21 is pushed down it is also pushed radially outward against the aperture edge 18 of disk 17. Thus, radially outer surface 49 forms a clamping face for holding disk 17 securely to the spindle clamp, the disk being seated atop rim 37 of hub 11.

The spindle clamp is fluid pressure actuated into a disk release position. A source of pressurized fluid, typically air, communicates with diaphragm 19 via passageways 57. Fluid 67 applies pressure against diaphragm 19 causing it to bulge upward. Since typically the bottom of the trough and diaphragm 19 are lower toward the central axis and higher toward rim 37, diaphragm 19 may also bulge slightly inward. However, this radially inward bulging is not essential for the operation of the spindle clamp, an upward bulging of diaphragm 19 being sufficient to force split jaws 21 up and in. Fluid fills the space 65 below diaphragm 19 but does not leak due to the fluid tight fit provided by recessed regions 61.

In the disk clamping position, O-ring springs 23 are stretched and exert a radially inward force on split jaws 21. As split jaws 21 are forced upward by bulging diaphragm 19, springs 23 force split jaws 21 inward to maintain engagement against angled wedge surface 43. Accordingly, split jaws 21 move inward away from disk 17, thereby enabling disk 17 to be removed. A new disk may then be inserted around split jaws 21 and the spindle clamp returned to a disk clamping position by removal of pressurized fluid 67.

Since pressurized fluid 67 acts to release a disk and springs 29 in FIG. 3 act to clamp a disk, the fluid pressure must be sufficient to overcome the spring force. Typical fluid pressures range from about 40 psi to 80 psi (200-400 cm Hg).

The spindle clamp of the present invention securely supports a disk without flexing. The clamp is fluid actuated to freely release the disk when desired. Further, since a magnet is not required, magnetic as well as optical data disks may be supported by this clamp without the risk of losing data. It will of course be recognized that the spindle clamp is capable of securely clamping a disk regardless of the clamp's orientation, so that while the above operation of the clamp has been described with the clamp in an upright orientation, the clamp work equally well with the clamp turned sideways or upside down.

I claim:

1. A spindle clamp comprising,
a hub rotatable about an axis, said hub having a trough defined in a top end surface thereof, a portion of said trough defining a wedge surface,
a jaw split into a plurality of jaw pieces and disposed in said trough, a portion of said jaw pieces extending above said top end surface defining a disk clamping face, a portion of said jaw pieces engaging said wedge surface,
means for biasing said jaw pieces inward toward said axis,
a cap in contact with a top surface of said jaw pieces,
means for biasing said cap downward against said jaw pieces, and
means for applying fluid pressure against said jaw pieces, said fluid pressure forcing said jaw pieces upward.

2. The clamp of claim 1 further comprising a diaphragm disposed in said trough, said jaw pieces being disposed over said diaphragm, said fluid pressure means communicating with said diaphragm for forcing said jaw pieces upward.

3. The clamp of claim 2 wherein said trough has recessed regions defined in inner and outer side surfaces thereof, said diaphragm engaging said recessed regions in a fluid tight fit.

4. The clamp of claim 2 wherein said fluid pressure means communicates with said diaphragm via a plurality of passageways through said hub.

5. The clamp of claim 1 wherein said means for biasing said jaw pieces inward comprises at least one O-ring spring, each of said at least one spring disposed in a groove defined in said jaw pieces.

6. The clamp of claim 1 wherein said cap comprises a head and a post, said head in contact with said top surface of said jaw pieces, said post extending from said head, said post fitting into a bore defined in said hub.

7. The clamp of claim 6 wherein said means for biasing said cap downward comprises a spring fitting around said post against said hub, said spring engaging a washer secured to an end of said post for biasing said post downward.

8. The clamp of claim 1 wherein said split jaw is formed from an annular piece having an annular channel formed in a top surface thereof and grooves defined on a radially inner surface of said channel, said jaw being split into said plurality of jaw pieces, radially inward surfaces of said jaw pieces engaging said wedge surface.

9. The clamp of claim 8 wherein said hub has central cone formed within said trough, the surface of said cone defining said wedge surface.

10. A spindle clamp for removably supporting a disk for rotation about an axis, the disk having a central aperture of a predetermined inside diameter, the clamp comprising, a cylindrical hub mountable on a base for rotation about a central axis, said hub having a diameter greater than an inside diameter of a disk, said hub having an annular trough defined in a top end surface of the hub, a portion of said top end surface radially outward from said trough forming a substantially flat rim for seating said disk, a portion of said hub radially inward from said trough forming a central cone with an angled wedge surface, a flexible annular diaphragm disposed in said trough, inner and outer side surfaces of said trough having annular recessed regions, inner and outer edges of said annular diaphragm engaging said recessed regions of said respective inner and outer side surfaces of said trough in a fluid tight fit, an annular jaw having an annular channel formed in a top surface thereof, a plurality of annular grooves being defined on a radially inner surface of said channel, said jaw being split into a plurality of pieces and disposed in said trough over said diaphragm, radially inward surfaces of said jaw pieces engaging said wedge surface, portions of radially outward surfaces of said jaw pieces forming a clamping face for securely engaging said disk at its central aperture, a plurality of O-ring springs disposed in said grooves for biasing said jaw pieces radially inward against said wedge surface, a cap having a disk-shaped head and a post extending from the center of said head, said hub having an axial bore through said central cone to a bottom end surface of said hub, said post fitting into said axial bore, a bottom surface of said disk-shaped head being in contact with said top surface of said split jaw, means for biasing said cap downward against said split jaw, and means for applying fluid pressure against said diaphragm, said fluid pressure means communicating with said diaphragm via a plurality of passageways through said hub.

* * * * *